PICKUP ARM

Filed Oct. 25, 1966 3 Sheets-Sheet 1

INVENTORS
Seisuke Shimoda
Hiroshi Arii
BY Hill, Sherman, Meroni, Gross & Simpson ATTORNEYS June 18, 1968 SEISUKE SHIMODA ETAL 3,388,912

PICKUP ARM

Filed Oct. 25, 1966 3 Sheets-Sheet 2

INVENTORS

Seisuke Shimoda

Hiroshi Arii

BY Hill, Sherman, Meroni, Gross & Simpson ATTORNEYS

PICKUP ARM

Filed Oct. 25, 1966

INVENTORS

Seisuke Shimoda

Hiroshi Arii

BY Hill, Sherman, Meroni, Gross & Simpson ATTORNEYS

United States Patent Office
3,388,912
Patented June 18, 1968

3,388,912
PICKUP ARM
Seisuke Shimoda and Hiroshi Arii, Tokyo, Japan, assignors to Sony Corporation, Tokyo, Japan, a corporation of Japan
Filed Oct. 25, 1966, Ser. No. 589,341
Claims priority, application Japan, Oct. 30, 1965, 40/66,603
2 Claims. (Cl. 274—23)

ABSTRACT OF THE DISCLOSURE

A pickup arm assembly used for the reproduction of sound from records. The pickup arm assembly includes a mounting bracket which has secured thereto pivotable means to pivotably secure the pickup arm to the mounting bracket to provide lateral and vertical movement of the pickup arm. Also secured to the mounting bracket is a pivotable plate which includes a contact surface and a cam surface. The plate is pivoted intermediate the two surfaces. An extended member is secured to the pivotable means for mounting the pickup arm and moves with the pickup arm. The extended member includes a contact end for engaging the contact surface of said pivotable plate to rotate the plate about its axis of rotation. A tensionable member is secured to the plate so as to wrap the cam surface. Rotation of the cam surface, by movement of the pickup arm, causes a force to be applied to the pickup arm corresponding to the shape of the cam surface and the tension of the tensionable member. This force is equal and opposite to the lateral forces exerted on the pickup arm due to the needle tracking in the groove of the record.

This invention relates generally to a pickup arm which is used in conjunction with a turntable or record changer, and more particularly to an improved pickup arm which makes it possible to greatly reduce the amount of distortion caused by lateral forces of the needle tracking within the groove of a record. Specifically, the present invention is directed to an improved pickup arm design wherein means are provided for cancelling the lateral force of the needle within the groove at every moving point along the tracking path.

During the reproduction of signal information from records, a stylus or needle is tracked within the groove of the record. The needle, which is attached to a tracking arm, is pushed towards the center of the record by the lateral vector quantity of frictional forces exerted on the needle due to the contact of the needle with the side walls of the groove in the record as well as the downward force exerted on the needle by the pickup arm. This vector sum is referred to as the lateral force or side-thrust force, which impedes the stable engagement of the needle tip within the groove of the record, causing distortion to be created in the output signal. Furthermore, the lateral forces exerted on the needle will cause increased wear on the inside walls of the groove, thereby shortening the life of the record. In the reproduction of a stereo record, especially the 45/45 type, the lateral forces exerted by the needle tend to upset the balance between the sound track of the reproduced sound. Unless the tracking angle is zero there will always exist a lateral force on the needle and this force becomes greater with an increase in the distance between the position of the needle on the record and the center of the record. In addition, it is very important that the lateral balance of the tracking arm is maintained with respect to an axis intersecting the vertical rotary shaft of the arm at right angles and passing through the supporting point of the arm. However, conventional types of pickup arms are unsatisfactory in this respect. That is, while in actual use, the rotary shaft of the arm is subjected to an undue force, or the arm is subjected to an unexpected force when it tilts.

Accordingly, one object of this invention is to provide a pickup arm which is well balanced by the lateral forces which occur while the arm is tracking a record.

Another object of this invention is to provide a pickup arm which is free from the side-thrust force.

A further object of this invention is to provide a pickup arm in which the lateral balance can be maintained while eliminating the side-thrust force.

Still another object of this invention is to provide a pickup arm which will allow the pickup cartridge to reproduce 45/45 stereo records without distortion while maintaining the correct balance of sound.

Other objects, features and advantages of this invention will become more apparent from the following detailed description when taken in conjunction with the accompanying drawings in which like reference numerals throughout the various views of the drawings are intended to designate similar elements or components and wherein.

Figure 1:
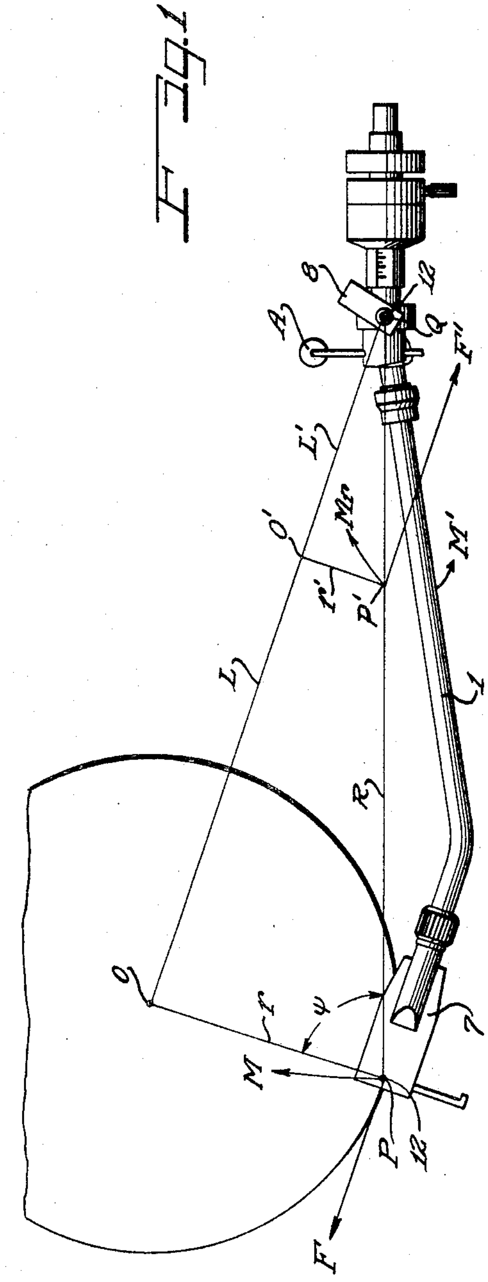
FIGURE 1 is a schematic diagram for explaining the principle of this invention.

In order to facilitate a better understanding of this invention, a description will be given in connection with a method of eliminating the above mentioned lateral force. In FIGURE 1 reference character O indicates the center of a turntable which is also the center of a record. Reference letter Q indicates the pivot point of a tracking arm 1, and P indicates the needle point of a stylus 2 which is associated with a cartridge 7 attached to the outer end of the tracking arm 1. Reference letter A indicates a counter-weight which is provided for lateral balance adjusting and will be described in greater detail hereinbelow. Reference letter F indicates the frictional force which is applied to the needle point P. The force F is in a direction tangent to the radius of a record 3 and can be expressed mathematically by the following equation, $F=\mu N$ where $\mu$ is the friction factor of the needle point and N is the stylus pressure.

The lateral force which is exerted on the point P is indicated by reference letter M. The force M is caused by the vector sum of the frictional force and the force due to the arm, which can be expressed as follows:

$$M=FR\cos\psi$$

where $\psi$ is an angle between a segment $PQ=R$, joining the needle point P and the pivot point Q, and a segment $OP=r$ joining the needle point P and the center O of the turntable. Therefore a segment OQ is provided between the pivot point Q and the center O and is designated by reference letter L. The cos $\psi$ is calculated in accordance with the cosine law $L^2=R^2+r^2-2Rr\cos\psi$. Substituting the calculated value of cos $\psi$ in the equation of the lateral force M, it follows that $$M=\frac{(R^2+r^2-L^2)}{2r}\times F$$

Figure 2:
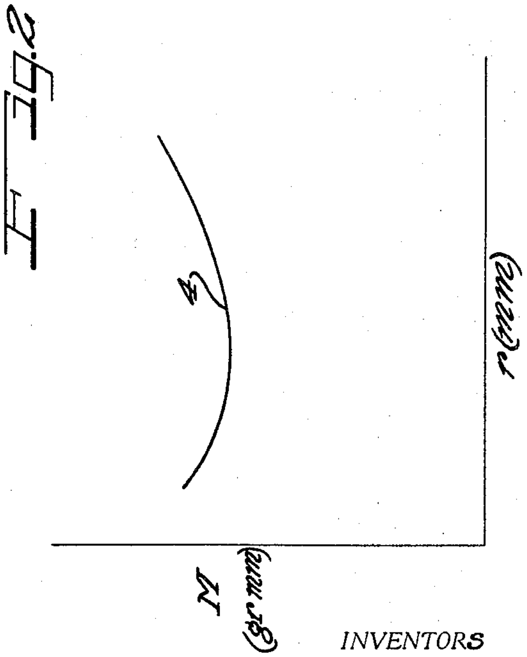
Figure 4:
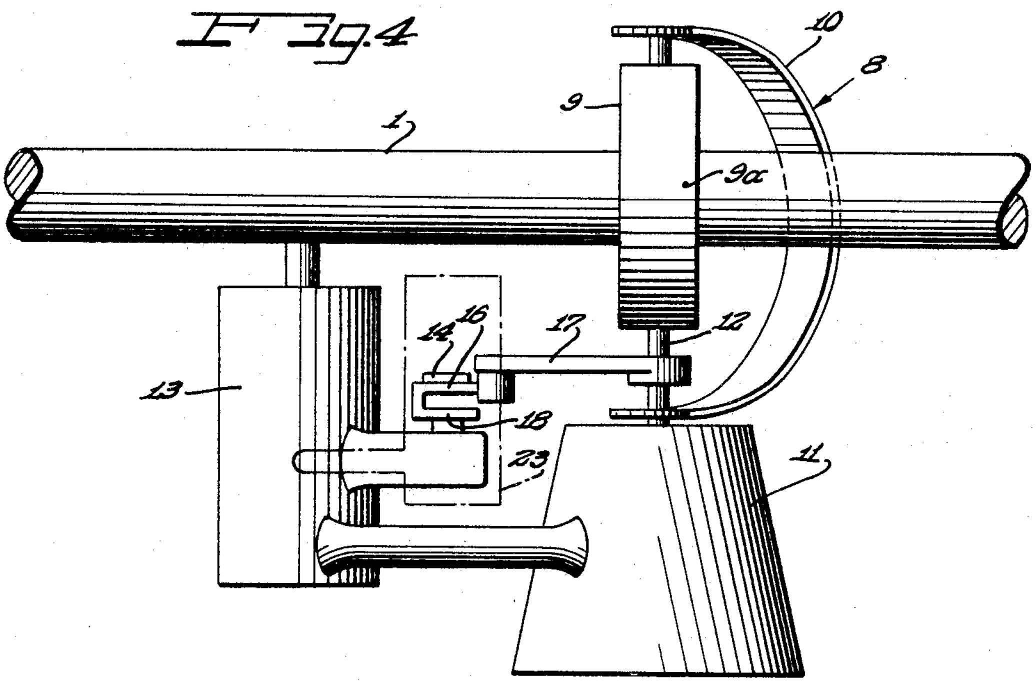
FIGURE 4 is an enlarged fragmentary side view schematically illustrating one example of a pickup arm produced according to this invention.
Figure 5:
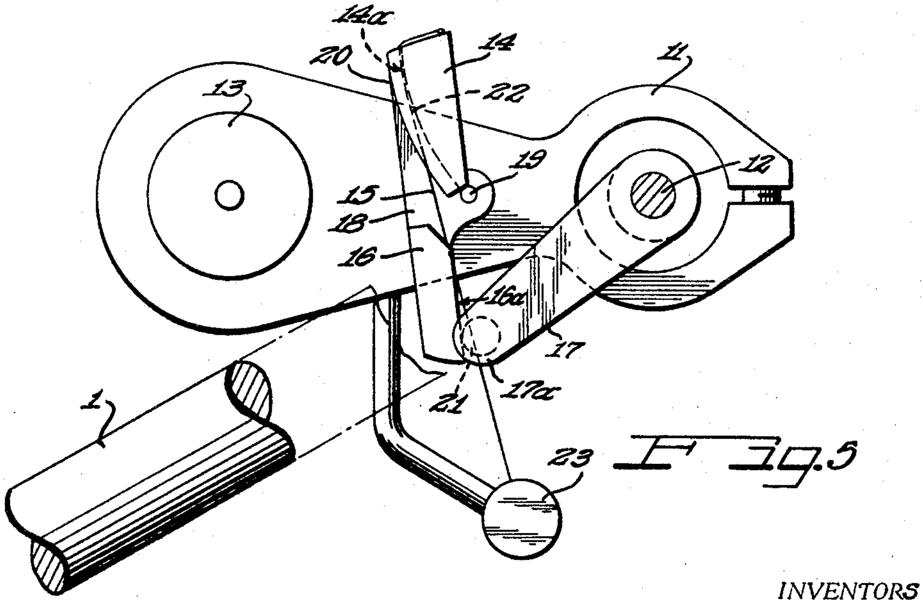
FIGURE 5 is an enlarged fragmentary top plan view schematically illustrating the principal part of the pickup arm.

That is, the variations in the lateral force M with respect to $r$ are as indicated by the curve 4 in FIGURE 2. It appears from the graph that as the needle point approaches the center O of the turntable the lateral force M increases after having gradually decreased. The lateral force M causes the needle tip to produce tracing distortion as described above. Therefore, the lateral force M must be eliminated but it varies along the curve 4 and hence it is very difficult to remove completely. With the application of this invention, however, the lateral force M can be completely eliminated independently of the position of the needle point P on the record 3.

In FIGURE 1 a line is drawn from a suitable point P′ on the segment PQ to the segment OQ in parallel to the segment PO and the point of intersection with the segment OQ is designated at O′. Since the triangle ΔQO′P′ is similar to that ΔQOP, the lateral force M can be offset by applying to the point P′ about the pivot point P the moment of a force M′ which is equal in magnitude to but opposite in direction to the lateral force M. The moment M′ can be broken down into a moment $Mr$ at the point P′ about the point O′ and a force on the segment QO. That is, when $QP'=R'$, $P'O'=r'$ and $QO'=L'$, it follows that $$\begin{aligned}\overline{M'}&=\overline{R'}\times\overline{F'}=(\overline{L'}+\overline{r'})\times\overline{F'}\\&=\overline{L'}\times\overline{F'}+\overline{r'}\times\overline{F'}\\&=\overline{L'}\times\overline{F'}+\overline{Mr}\end{aligned}$$

Since $\overline{L'}\times\overline{F'}$ is a force acting along the segment OQ connecting the center O and the pivot point Q, the lateral force M can be eliminated by suitable selection of the moment $Mr$. The moment $Mr$ can be expressed in the form of a function of the angle $\psi$ as follows:

$$Mr=r'F'=rF=F\left(L\cos\psi\pm\sqrt{L^2\cos\psi^2-L^2+R^2}\right)$$

Figure 3:
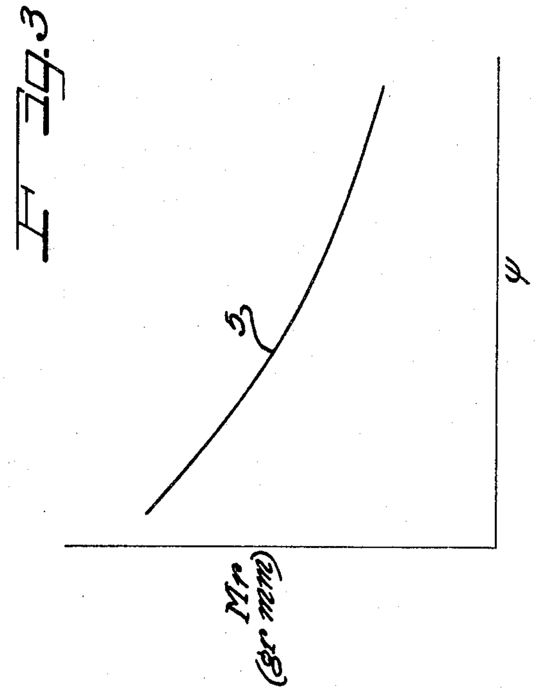
FIGURES 2 and 3 are graphs for explaining this invention.

The relationship between the moment $Mr$ and the angle $\psi$ is as indicated by the curve 5 in FIGURE 3, in which the moment $Mr$ gradually increases with a decrease in the angle $\psi$. Accordingly, the moment can easily be varied along the curve 5 in accordance with the angle $\psi$, so that the lateral force M can be completely eliminated. The moment Mr which varies with the angle $\psi$ can be produced by a cam plate which moves about the point O′. A stretched thread or small cable is engageable with the cam face to provide a turning force on the cam plate, and a device turning together with the cam plate to provide a turning force on the tracking arm 1 at the point P′. The following description will be given in connection with one embodiment of this invention with reference to FIGURES 4 to 8. Reference numeral 1 indicates the tracking arm, the front end of which has mounted thereon the cartridge 7 and the rear end of which is attached to a support assembly which is designated generally by reference numeral 8. The arm 1 is mounted to the support assembly 8 in such a manner as to rotate in vertical and lateral planes. The tracking arm 1 is inserted into an inner frame 9 and attached thereto so as to be rotatable in the vertical plane about the pivot point 9$a$. The inner frame 9 is in turn arranged such that the tracking arm 1 may be mounted within an outer frame 10 so as to be rotatable in the lateral plane. This arrangement provides both vertical and lateral movement to the arm 1. The outer frame 10 is secured to a fixed stand 11 by a vertical rotary shaft 12 which is affixed to both the inner frame 9 and the outer frame 10. Reference numeral 13 identifies a raise/lower device by means of which the stylus 2 lowers gently into the groove of the record 3, and this device is attached to the fixed stand 11 by suitable means.

In this example, a rotary cam plate 14 is provided on a stationary part which may be part of the stand 11. A thread or small cable 15 is trained around the cam plate 14 and its cam face 14$a$, the thread 15 being stretched at a certain constant tension. Also, a slide contactor 16 is provided integrally with the cam plate 14. The slide contactor 16 provides a force to an arm member 17 which, in turn, delivers this force to the arm 1 to eliminate the lateral force M. To this end, a rotary member 18, of substantially rectangular configuration is provided and is pivotably mounted to the stationary part in such a manner as to be rotatable about its intermediate portion. The blade-shaped cam plate 14 is mounted in the lengthwise direction on the rotary member 18 with its top end lying at the pivot point 19. Further, a flange plate 20 is provided on the cam plate 14 and the cable 15 is arranged to be guided between the flange plate 20 and the rotary member 18. Another slide contactor similar to that of the slide contactor 16 is mounted on the other side of the rotary member 18 in such a manner as to be disposed in the lengthwise direction thereof and is designed such that the free end 17$a$ of the arm member 17 may be in sliding contact with the slide contact surface 16$a$ of the slide contactor 16. In this case, it is preferred to provide a roller 21 on the free end of the arm member 17 so as to facilitate the sliding action of the free end 17$a$ against the slide contact surface 16$a$. An imaginary line connecting the axis of the roller 21 with the central point 19 of the rotary member 18 is adapted to be in parallel with the slide contact surface 16$a$. Also, the other end of the arm member 17 is secured to the vertical rotary shaft 12. One end of the cable 15 is secured to the cam plate 14 on the opposite side from the central point 19 thereof, while the other end is fixed in such a manner so that the cable 15 may lie along the cam face 14$a$. Therefore, as the tracking arm 1 approaches the center O of the turntable, the arm member 17 also rotates at its free end 17$a$ to push the slide contactor 16 and rotate the member 18.

As a result of the above action, the cam plate 14 is also rotated, changing the position of a point 22 where the cable 15 moves out of contact with the cam face 14$a$. Then, the cam plate and consequently the slide contactor 16 is rotated by the tension of the cable 15 to push the arm member 17, thus changing the lateral force which is produced thereby to cancel the lateral force M. For example, suppose that the rotary center 19 of the rotary member 18 is O′, and that the rotary center of the roller 21 is P′ and that the vertical rotary shaft 12 is P. The locations of the points O′ and P′ are selected so that the triangle ΔO′P′P may be similar to that ΔOPQ. The shape of the cam face 14$a$ and the tension of the cable 15 are selected in a manner so that the moment Mr acting upon the point P may vary with the angle $\psi$ defined by the sides P′O′ and P′Q of the triangle ΔO′P′Q as indicated by the curve 5 in FIGURE 3.

Figure 6:
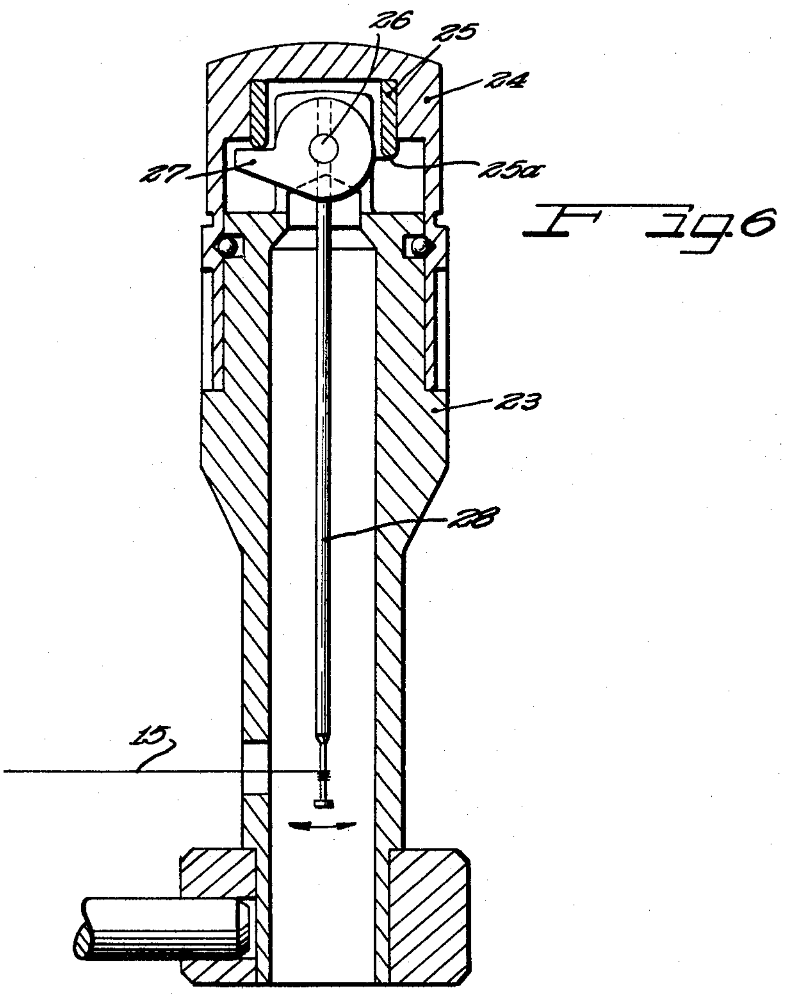
FIGURE 6 is an enlarged fragmentary longitudinal sectional view showing a tension adjusting unit of the pickup arm depicted in FIGURE 4.

In order to vary the tension of the cable 15 with the stylus pressure, a cap member 24 is mounted on the top of a cylindrical member 23 having one end thereof anchored to a stationary part, as best seen in FIGURE 6. A ring cam 25 is provided on the inside of the cap member 24, coaxially therewith, the ring cam 25 having a slanting cam face 25$a$ at the lower portion thereof. Within the cylindrical member 23 there is provided a rotary shaft 26 crossing the axis of the member 23 at right angles thereto and a coupling member 27 is secured to the shaft 26. The free end of the coupling member 27 makes contact with cam face 25$a$ and one end of an elastic member 28 such as a piano wire is secured to the rotary shaft 26 at the axial position of the cylindrical member 23, and the cable 15 is connected to the other end of the elastic member 28. This allows the elastic member 28 to rotate about the shaft 26. Rotation of the cap member 24 is provided to ensure proper adjustment of the tension of the cable 15.

With the use of the pickup arm described above, as the needle point P, which is attached to the end of the tracking arm 1, approaches the center O of the turntable, the arm member 17 rotates to cause the slide contactor 16 and consequently the cam plate 14 to rotate, changing the point 22 where the cable 15 gets out of contact with the cam face 14$a$. Therefore, the force applied to the arm member 17 is varied by the tension of the cable 15 and in this case the relationship such that $\Delta OPQ \sim \Delta O'P'Q$ can always be maintained, so that the side-thrust force or the lateral force M can completely be eliminated irrespective of the position of the tracking arm.

Now, a description will be made in connection with a method for acquiring the normal lateral balance of the pickup arm. The lateral balance referred to in this specification means the right and left balance of the pickup arm in the normal operative condition with respect to an axis crossing the vertical rotary shaft of the pickup arm at right angles thereto and passing through the supporting point.

Figures 7, 8:
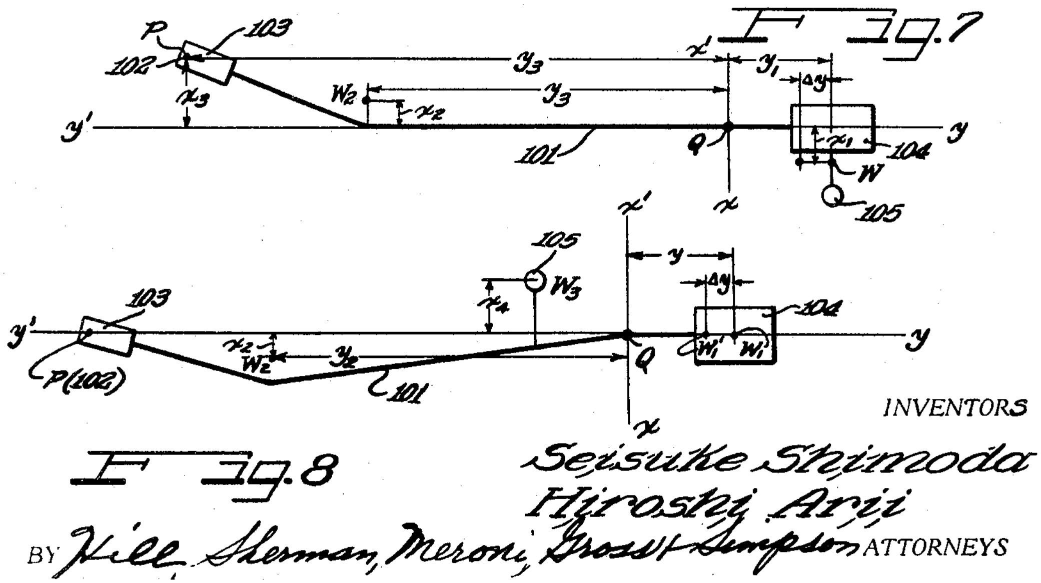
FIGURE 7 is a diagrammatic showing of a conventional type of pickup arm.
FIGURE 8 is a diagrammatic showing of the pickup arm produced according to this invention.

FIGURE 7 illustrates a conventional type of pickup arm. Reference numeral 101 indicates a tracking arm, 102 a needle point, 103 a cartridge, 104 a counterweight for applying a desired stylus pressure to the cartridge and 105 an additional counterweight for adjusting the lateral balance. In this pickup arm the vertical balance is acquired by moving the counterweight 104 at the rear end of the tracking arm 101, while the horizontal balance is obtained by adjusting the position of the additional counterweight 105.

Therefore, the following equation holds true;

$$W_1x_1=W_2x_2,\quad W_1y_1=W_2y_2$$

where $W_1$ is the overall weight on the right side of the supporting point including the counterweight 104 and the additional counterweight 105. That is, $W_1$ is the position of the center of gravity of the counterweights 104 and 105. $W_2$ is the weight on the left side of the supporting point including the cartridge and the position of the center of gravity thereof, $y_1$ is the distance from the supporting point to $W_1$ in the direction of the Y-axis, $x_1$ is the distance in the direction of the X-axis, $y_2$ is the distance from the supporting point to $W_2$ in the direction of the Y-axis and $x_2$ is the distance in the direction of the X-axis.

In the operation of this pickup arm the counterweight 104 is shifted a distance $\Delta y$ and the needle point is subjected to a stylus pressure given by the following equation.

$$F=\frac{W_2x_2-W_1(y_1-\Delta y)}{y_3}=W_1\frac{\Delta y}{y_3}$$

In this case, since the distance $x_1$ from the Y-axis to $W_1$ does not vary, the so-called lateral balance is not lost. Under such circumstances, however, the needle point is subjected to an upward reaction force equal to $$F=W_1\frac{\Delta y}{y_3}$$

The needle point is spaced a distance $y_3$ in the Y-axis direction and a distance $x_3$ in the X-axis direction as seen from the figure, so that a component of force of $M=Fx_3$ is produced with respect to the Y-axis. Therefore, although the tracking arm 101 is balanced in the static condition it becomes unbalanced in the dynamic condition thereby causing an unbalance in the reproduced signal. That is, an undue force is applied to the rotary shaft to disturb its smooth rotation or an unexpected force is applied to the arm when the arm tilts.

In the pickup arm of this invention, as illustrated in FIGURE 8, a counterweight is located such that its center of gravity may lie on the Y-axis connecting the supporting point Q of the tracking arm 101 with the needle point P and an additional counterweight is positioned on the side of the cartridge from the supporting point.

In order to maintain the lateral balance, the vertical balance is acquired by adjusting the counterweight to the position of $W_1$ and then the horizontal balance is obtained by adjusting the distance $x_4$ from the Y-axis to the additional counterweight. That is, it is sufficient for the purpose that $W_3x_4=W_2x_2$, where $W_3$ indicates the weight and the center of gravity of the additional counterweight, $W_2$ represents the overall weight and the center of gravity of the tracking arm and the cartridge disposed on the left side of the supporting point, $W_2$ being spaced a distance $y_2$ from the X-axis and a distance $x_2$ below the Y-axis.

When the counterweight 104 is moved a distance $\Delta y$ for producing a certain stylus pressure, the center of gravity of the counterweight shifts from $W_1$ to $W_1'$. Since $W_1'$ stays on the Y-axis, the lateral balance is not lost. When the arm is put on the record the needle point is subjected to a reaction force $$F=W_1\frac{\Delta y}{y_3}$$

as in the foregoing example, but the needle point lies on the Y-axis and no moment is produced with respect to the Y-axis, so that the lateral balance is maintained. Further, according to this invention the lateral balance can be maintained independently of the stylus pressure.

It will be apparent that many modifications and variations may be effected without departing from the scope of the novel concepts of this invention.

We claim as our invention:

1. A pickup arm assembly for use in the reproduction of records, comprising:

a tracking arm having two ends, a support member mounted so as to be in spaced relation with respect to the record;

pivot means secured to said tracking arm intermediate its two ends for pivotably mounting said tracking arm to said support member;

a pivotable plate pivotably mounted to said support member, said pivotable plate including a contact surface and a cam surface, said plate pivoted intermediate said contact surface and said cam surface;

an extended member having one end thereof secured to said pivot means for lateral movement therewith in coincident with the lateral movement of said tracking arm, the other end of said extended member engaging said contact surface of said pivotable plate for causing rotation of said plate about its axis; and a pretensioned member secured to said pivotable plate and engageable with said cam surface, whereby movement of said tracking arm in a lateral direction toward the center of the record causes the camming surface to rotate and vary the tension exerted by said pretensioned member to create a lateral force on said tracking arm which is equal and opposite to the lateral force exerted on said tracking arm due to the action of said tracking arm moving along the grooves of the record.

2. A pickup arm assembly according to claim 1 further including a hollow cylindrical member secured to said support member; a rotatable cap positioned at one end of said cylindrical member; a ring cam positioned within said cap; a lever pivotably secured in said cylindrical member in a plane parallel to the axis of said cylindrical member and engaging said ring cam; a resilient member secured to said lever and extending therefrom and terminating within the body of said cylindrical member, the other end of said pretensioned member being secured to the end of said resilient member, whereby, the tension applied to said pretensioned member is controlled by said ring cam and said lever within said cylindrical member.

References Cited

UNITED STATES PATENTS

| | | | |
|---|---|---|---|
| 3,088,742 | 5/1963 | Alexandrovich | 274—23 |
| 3,318,603 | 5/1967 | Mortimer | 274—23 |

FOREIGN PATENTS

| | | |
|---|---|---|
| 997,317 | 7/1965 | Great Britain. |

OTHER REFERENCES

Publication: Audio, September 1962, "A New Turntable-Arm Design," by Edgar Villchur, pp. 19–23, 68 and 69.

HARRY N. HAROIAN, *Primary Examiner.*